J. C. HOBBS.
COMBINED LIGHT AND STRUCTURE.
APPLICATION FILED NOV. 15, 1920.
1,416,467.
Patented May 16, 1922.
3 SHEETS—SHEET 3.
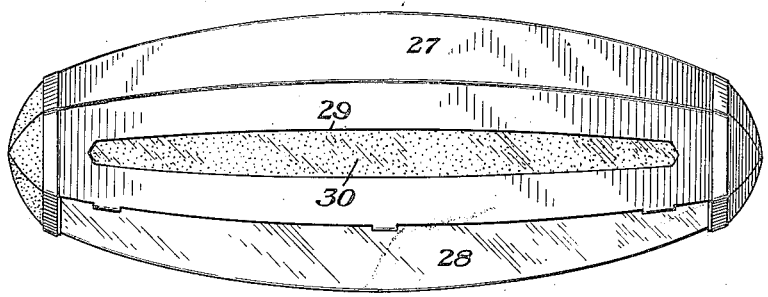
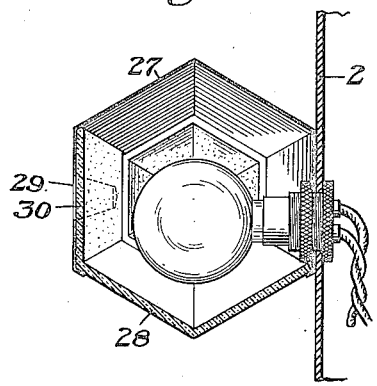
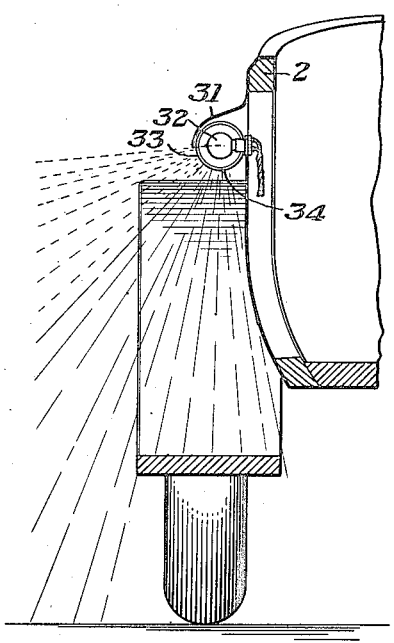
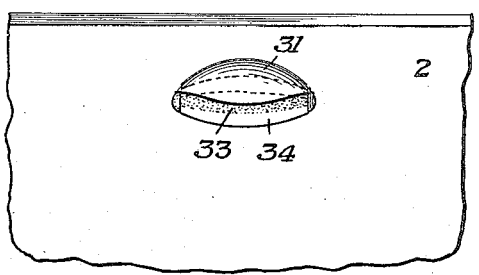
Inventor
Jas. C. Hobbs
By Bakewell, Byrnes & Parmelee
Attorney

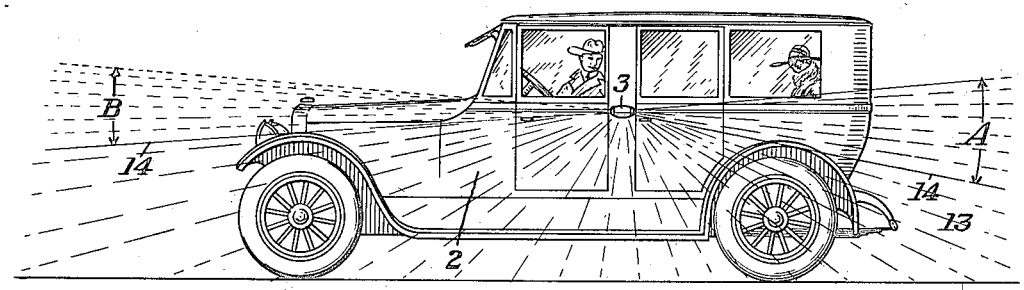
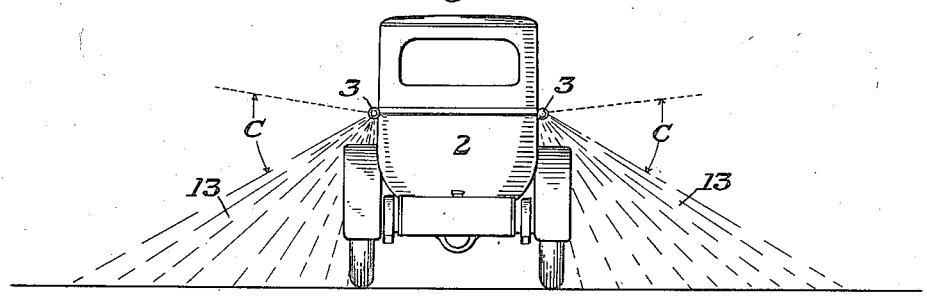
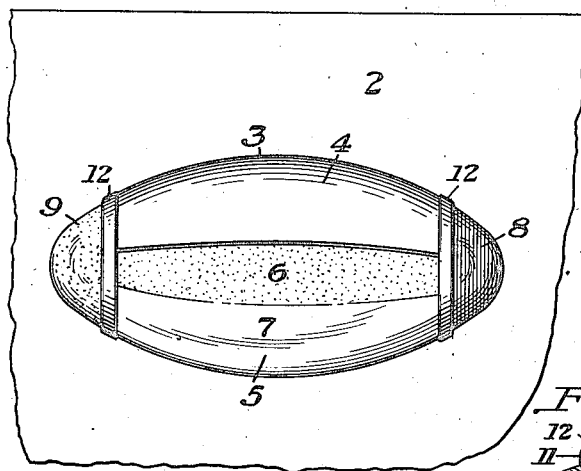
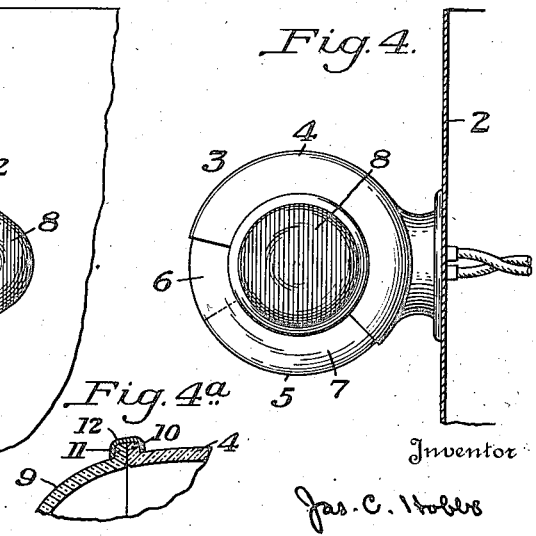

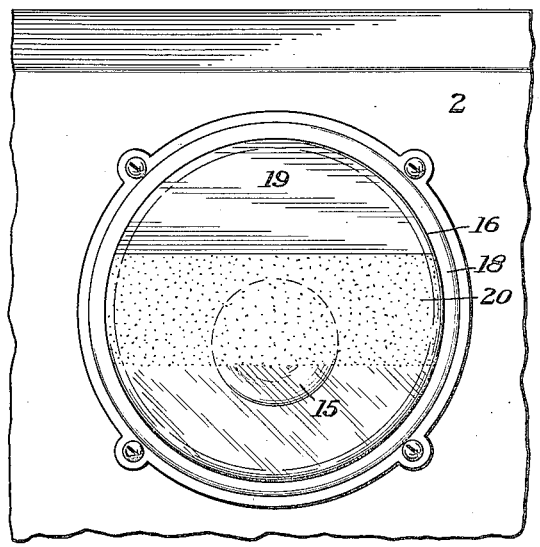
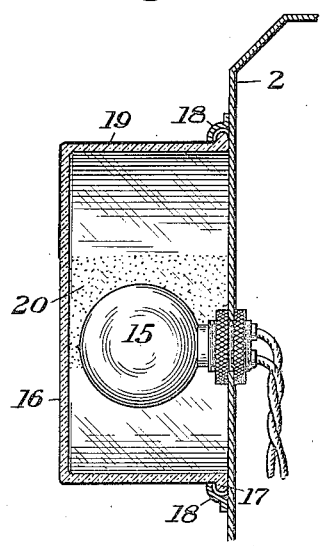
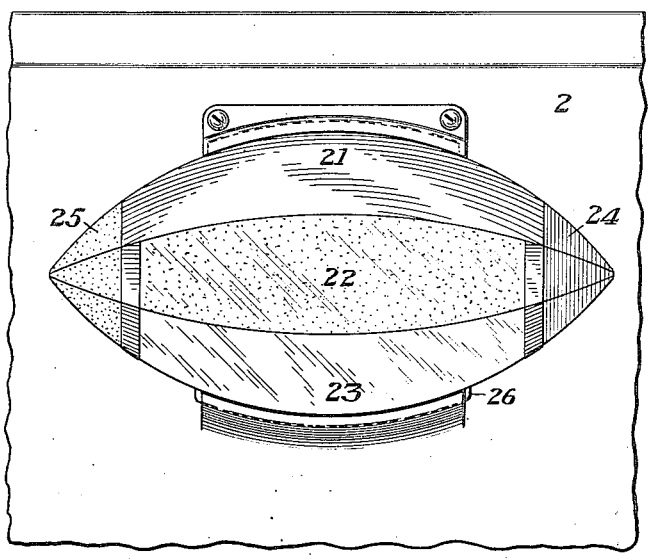
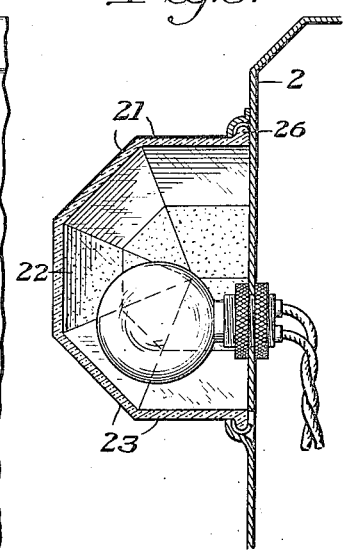

UNITED STATES PATENT OFFICE.

JAMES C. HOBBS, OF PITTSBURGH, PENNSYLVANIA.

COMBINED LIGHT AND STRUCTURE.

1,416,467.  Specification of Letters Patent.  Patented May 16, 1922.

Application filed November 15, 1920. Serial No. 424,053.

*To all whom it may concern:*

Be it known that I, JAMES C. HOBBS, a citizen of the United States, residing at Pittsburgh, Allegheny county, Pennsylvania, have invented a new and useful Improvement in Combined Light and Structure, of which the following is a full, clear, and exact description.

The present invention relates broadly to illumination, and more particularly to a combined light and structure for automobile illumination.

The principal object of the present invention is to provide a combined structure of the type referred to which will make night operation of motor vehicles safer.

Another object of the invention is to provide means for illuminating and definitely defining the sides of a motor vehicle without producing any light rays interfering with the operator of said vehicle or an approaching operator.

A further object of the invention is to illuminate the sides of a vehicle by illuminating rays, none of the direct rays of which project above the horizontal plane of the source of light.

A still further object of the invention is to render an automobile visible at night to drivers of vehicles approaching from any angle or direction.

An additional object of the present invention is to combine the light and vehicle body in such manner that the source of light is always to the rear of, at one side of, and below the eyes of the operator of the vehicle.

The foregoing and other objects, together with their attendant advantages, will be apparent as the invention becomes better understood, by reference to the accompanying specification and drawings forming a part thereof, it being premised that changes may be made in the various details and the manner of operation, within the scope of the appended claims, without departing from the spirit of the invention.

Figure 1 is a side elevation of a vehicle illuminated in accordance with the present invention;

Figure 2 is a rear view of the vehicle illustrated in Figure 1;

Figures 3, 4 and 4ª are detail views of the illuminating means employed;

Figure 5 is a side elevation of a portion of a vehicle equipped with a modified form of illuminating means;

Figure 6 is a sectional view of the construction illustrated in Figure 5;

Figures 7 and 8 are views corresponding to Figures 5 and 6 and illustrating a modified form of illuminating means;

Figures 9 and 10 are views corresponding to Figures 5 and 6 and illustrate a still further modification;

Figure 11 is a side elevation of a vehicle body having an integral light receiving pocket; and Figure 12 is a sectional view through the structure illustrated in Figure 11.

At the present time, in automobile illumination, it is customary to rely for safety at night on head-lights and tail-lights, suitable diffusing, absorbing or reflecting means being provided for the head-lights. Where additional side lights are utilized, they are customarily positioned on the cowl of the vehicle in front of the driver in such manner that direct illuminating rays are projected above a horizontal plane into the eyes of an approaching driver. Such lights are frequently referred to as "blinders" due to the high candle-power lamps used. On misty or foggy nights such light rays are partially reflected back into the eyes of the driver of the vehicle so equipped, thereby interfering with the operation of the car and increasing the danger both to himself and to other drivers without producing any beneficial illumination either of his own car or of the roadway.

Other side lights have also been employed to some extent, but in such cases they have projected direct rays above the horizontal plane occupied by the source of light and have not produced effective side illumination of the vehicle so equipped.

By the present invention, a light of suitable character is combined with the vehicle body in such manner that the limits of the vehicle body are definitely defined, the running board thereof is illuminated for safety in entering or alighting from the vehicle, and the driver of the vehicle is enabled to see side obstructions without being subjected to any blinding or dangerous rays of light.

Referring more particularly to the drawings, there is illustrated in Figure 1 a motor vehicle, the body 2 of which is provided with the usual driver's seat. Secured to each side of the body 2 to the rear of the driver's seat and below the eyes of the driver, is an illuminating means 3. As illustrated in Figures 3 and 4, each of these illuminating means may comprise a suitable metallic or other non-transparent casing 4 adapted to partially enclose the source of light and support a lower light transmitting member 5. With this form of the invention, the member 5 may comprise a suitably shaped glass having a frosted portion 6 and a clear portion 7. The ends of the casing 4 may be closed by light modifying members such as a red lens 8 for the rear of the casing and a frosted lens 9 for the front thereof. In Figure 4ª the casing 4 is shown as provided with a bead 10 and one of the lenses is shown as provided with a bead 11, which beads are held in position by a ring or ferrule 12 of any desired construction. With a combined light and structure of the type illustrated in these figures, it will be apparent that direct illuminating rays 13 are directed against the sides of the vehicle and on the roadway as clearly indicated in Figures 1 and 2, with none of the direct illuminating rays projecting above a plane indicated by the lines 14. To the rear of the vehicle will be projected subdued red rays through the zone A, while to the front of the vehicle will be projected subdued rays by the frosted lens 9 through the zone B. To either side of the vehicle will be projected subdued rays in the zones C through the frosted portion 6 of the plate 5. It will be apparent that so far as illuminating value is concerned, the rays in the zones A, B and C may be entirely disregarded, as these rays do not interfere either with the operator of the vehicle equipped as described, or with the operator of approaching vehicles.

Referring to the form of the invention illustrated in Figures 5 and 6, the car body 2 is illustrated as having a light source 15 secured thereto and enclosed by a circular transparent cup-shaped casing 16. This casing may be formed with a peripheral bead 17 adapted to be engaged by a fastening ring 18, which is in turn secured to the vehicle body. With such a construction, a part of the upper portion of the casing may be rendered opaque by a silvering or enameling coating 19. Directly below such opaque portion, the casing may have a frosted band 20 to subdue light rays projecting horizontally from the source of light and prevent a direct view of such light source from any point within the horizontal plane containing the same. The remainder of the casing may be clear glass, as indicated in the drawings.

In Figures 7 and 8 is illustrated a slightly modified form of the invention comprising an angular casing having its upper portion 21 silvered, its intermediate portion 22 frosted and its lower portion 23 of clear glass. The rear end 24 of the casing may be suitably coated to produce a red area, while the corresponding front portion 25 may be frosted for the purposes before described. Instead of securing the casing in position by a peripherally extending bead as disclosed in Figures 5 and 6, the casing may be provided with upper and lower lugs or projections 26 adapted to be suitably engaged by fastening devices for attaching the same to the vehicle body.

In Figures 9 and 10 the vehicle body 2 is illustrated as provided with a sectional casing comprising an upper opaque portion 27 and a lower transparent portion 28, the ends being formed by red and frosted closures, as before described.

In this construction, however, one side of the opaque section 27 is provided with a longitudinally extending opening 29 adapted to co-operate with a frosted portion 30 of the transparent section 28.

In Figures 11 and 12 the vehicle body 2 is illustrated as having a pocket formed in the side thereof by pressing outwardly a portion 31 thereof to serve as a shield for a source of light 32 mounted within the pocket. This source of light may be constructed in accordance with any of the forms of the invention herein illustrated, to provide a frosted area 33 and a clear glass area 34.

With all of the forms of the invention illustrated, it will be apparent that no direct illuminating rays are projected above the horizontal plane containing the source of light. The construction is also such that a direct view of the source of light from any point situated in the horizontal plane containing the same is prevented. These features are highly advantageous, as blinding rays are prevented, thereby enabling the invention to be utilized with safety.

In each instance the casing enclosing the light source is so constructed that its greatest vertical dimension is in a plane substantially intermediate the ends thereof, the vertical dimension decreasing from such plane toward either end. By reason of this construction, a substantially curved lower transparent closure is provided which is effective for directing light rays downwardly against the sides and running board, as well as forwardly and rearwardly to a sufficient extent to illuminate the fenders and define the outlines of the car.

Due to the positioning of the source of light in the manner described, to the rear of the driver's seat and below the plane of his eyes, it will be apparent that there is produced a highly desirable illumination of the vehicle itself and of the roadway at either side thereof without interfering with the driver of the vehicle or the drivers of approaching vehicles.

A further advantage results from the illumination of the sides of the vehicle in such manner that its outlines are clearly defined and it is rendered visible to cars approaching at right angles thereto, as well as to cars approaching from the front or rear.

I claim:

1. In an illuminating means for vehicles, a casing comprising a transparent closure at the under portion thereof adapted to permit the passage of light rays substantially vertically downwardly therefrom, an opaque closure at the upper portion thereof, and a translucent closure extending from said transparent closure to said opaque closure whereby the passage of direct illuminating rays of high intensity above the horizontal plane occupied by said casing is prevented, substantially as described.

2. An illuminating means for vehicles, comprising a casing having its greatest vertical dimension at a point intermediate the ends thereof, and having the vertical dimension decreasing from said point toward either end, said casing comprising an opaque portion, a transparent portion for directing light rays downwardly, forwardly and rearwardly thereof only, and a frosted portion cooperating therewith, substantially as described.

3. A combined light and structure, comprising a vehicle body, a source of light secured thereto and projecting high intensity rays against a portion of the body below, to the front of and to the rear of said light, and means for preventing the passage of high intensity rays above the horizontal plane occupied by said light, said means also permitting the projection of low intensity rays forwardly and rearwardly of the light, substantially as described.

4. A combined light and structure, comprising a vehicle body, a driver's seat therein, a source of light secured to one side of said body, said light being secured to the rear of said seat and below the eyes of a driver in said seat, and means cooperating with said source of light to prevent at all times a direct view thereof from any point above the horizontal plane occupied thereby, said light source directing high intensity rays to the road surface adjacent the vehicle and intermediate the ends thereof, and low intensity rays substantially horizontally thereof for indicating the position of the light, substantially as described.

5. A combined light and structure, comprising a vehicle body, a driver's seat therein, a light secured to one side of said body, said light being secured to the rear of said seat, and means cooperating with said light to obstruct the passage of high intensity illuminating rays above the horizontal plane occupied by said light, said light directing high intensity rays to the road surface adjacent the vehicle and intermediate the ends thereof and low intensity rays substantially horizontally thereof for indicating the position of the light, substantially as described.

6. A combined light and structure, comprising a vehicle body, a driver's seat therein, a light secured to one side of said body, said light being secured to the rear of said seat and below the eyes of a driver in said seat, and means cooperating with said light to obstruct the passage of high intensity illuminating rays above the horizontal plane occupied by said light, said light directing high intensity rays to the road surface adjacent the vehicle and intermediate the ends thereof and low intensity rays substantially horizontally thereof for indicating the position of the light, substantially as described.

7. A combined light and structure, comprising a vehicle body, a driver's seat therein, a light secured to one side of said body to the rear of said seat and below the eyes of a driver in said seat, and means opaque to the passage of light rays cooperating with the upper portion of said light to prevent the passage of high intensity rays above the horizontal plane occupied by said light, said light being effective for illuminating by high intensity rays a lower portion of the side of the vehicle intermediate the ends thereof, and for indicating the position of the light by low intensity rays projected substantially horizontally thereof, substantially as described.

8. A combined light and structure, comprising a vehicle body, a driver's seat therein, a light secured to one side of said body to the rear of said seat and below the eyes of a driver in said seat, and means opaque to the passage of light rays cooperating with the upper portion of said light to prevent the passage of high intensity rays above the horizontal plane occupied by said light, said light being effective for illuminating a lower portion of the side of the vehicle intermediate the ends thereof by high intensity rays directed downwardly, rearwardly and forwardly of the light, and for indicating the position of the light by low intensity rays projected substantially horizontally thereof, substantially as described.

9. A combined light and structure, comprising a vehicle body, and illuminating means secured to the side thereof for directing high intensity illuminating rays forwardly, rearwardly and downwardly against the side of said vehicle for illuminating a considerable portion thereof and low intensity rays substantially horizontally thereof for indicating the position of the light, and means for preventing the passage of high intensity illuminating rays above the horizontal plane occupied by said illuminating means, substantially as described.

10. An illuminating means for vehicles, comprising a casing having an opaque upper portion, a transparent under portion for directing light rays downwardly, forwardly and rearwardly thereof only, and a translucent portion intermediate said opaque and transparent portions permitting the passage of low intensity rays, substantially as described.

11. An illuminating means for use on the outside of vehicles, comprising a light source projecting high intensity rays directly against a portion of the outside of the body of the vehicle to illuminate the same and low intensity rays to indicate the position of the light source, and means for preventing the projection of any high intensity rays above the horizontal plane occupied by the light source, substantially as described.

12. An illuminating means for vehicles, comprising a light source projecting high intensity rays to illuminate a portion of the vehicle body and a portion of the road to one side of and adjacent the vehicle, said light source projecting low intensity rays to indicate the position of the light source, and means preventing the projection of any high intensity rays above the horizontal plane occupied by the light source, substantially as described.

In testimony whereof I have hereunto set my hand.

J. C. HOBBS.